Jan. 3, 1928.

M. A. McCUE

DRAIN VALVE

Re. 16,844

Original Filed Sept. 26, 1925

WITNESSES

H. T. Walker

Chris Feinle.

INVENTOR

Martin A. McCue.

BY Munn & Co

ATTORNEYS

Reissued Jan. 3, 1928. Re. 16,844

UNITED STATES PATENT OFFICE.

MARTIN ALOYSIUS McCUE, OF LONG BRANCH, NEW JERSEY.

DRAIN VALVE.

Original No. 1,591,859, dated July 6, 1926, Serial No. 58,857, filed September 26, 1925. Application for reissue filed June 15, 1927. Serial No. 199,394.

This invention relates to drain valves in general and in its specific application as shown in the drawings it is particularly intended and adapted to take the place of the conventional screw plug common to the crankcase of an internal combustion engine.

It will be appreciated that the frequent removal and replacement of an ordinary screw plug from the bottom of a crankcase for the purpose of draining the oil is at best an arduous task, by reason of the drain opening being not easy of access due to its location in the lowest portion of the crank-case, and also by reason of it being particularly difficult to reengage the screw threads whilst lying in an awkward position underneath the engine in an endeavor to reinsert an ordinary plug in the opening.

With the present invention as illustrated in the drawings, there is provided an improved screw plug that remains permanently fixed in the opening, said plug being equipped with a valve that may be manually operated to an open or a closed position and that is of such construction as to permit of this being readily accomplished from a distance by the use of a rod, hook, or the like.

One of the objects of the present invention is to provide an improved device for the purpose described that is of such form and structure as not to substantially exceed the general overall dimensions of the screw plug now in use.

A further object is to provide a highly efficient and easily operated device in the nature of a drain plug, that is not open to the objections of a common screw plug as above set forth.

Various other objects and advantages of the invention will be in part obvious from an inspection of the accompanying drawings and a careful consideration of the following particular description and claims of one form of mechanism embodying my invention.

Figure 1:
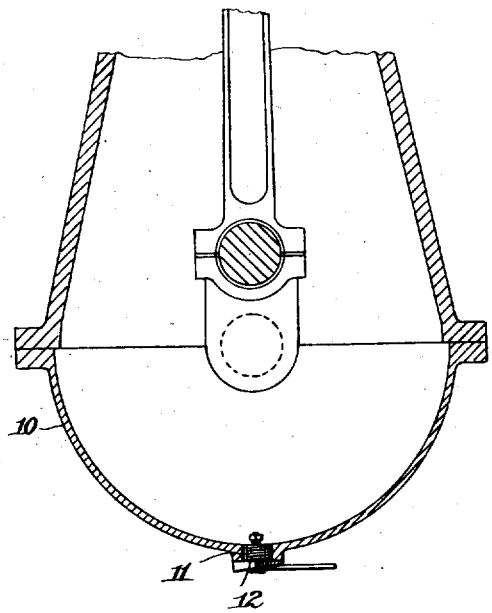
Figure 1 is a sectional view of a portion of a crank-case with the drain valve of the present invention employed in the drain opening at the bottom of said crank case.
Figure 2:
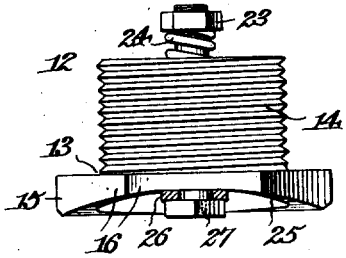
Fig. 2 is a side elevation of the drain valve detached with the valve lever shown in section, the section being taken on the line 2—2 of Fig. 3.
Figure 3:
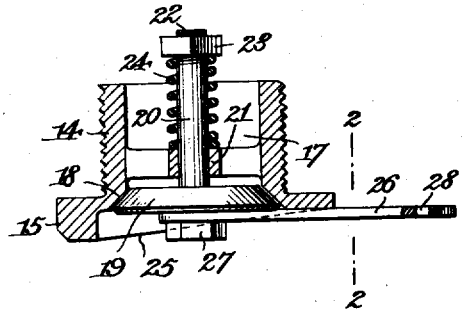
Fig. 3 is a central vertical sectional view through the drain valve with the valve member and its lever shown in elevation.

Referring now more particularly to the several views of the drawing, it will be apparent that there is conventionally shown a crank case 10, the bottom section of which is provided with screw-threaded drain opening 11 in which is employed the drain valve 12 of the present invention. The said drain valve includes an element 13 in the nature of a plug having a screw-threaded portion 14 and a portion 15. The portion 14 is capable of being threaded into the opening 11, and this is accomplished by the use of a suitable tool applied to the portion 15 which is in the nature of a nut in that the same is provided with "flats" 16. The element 13 has a passage 17 extending therethrough, and the said passage is controlled by a valve means presently to be described. The said valve means includes a beveled seat 18 at the lower end of the passage 17. A valve member 19 is employed which is arranged for movement into and out of contact with the seat 18. The said valve member is of frustro-conical shape to conform to the shape of the seat 18 and thus closely fit the same. The valve member 19 is provided with a stem 20 which extends through a spider 21 and has sliding movement with respect thereto as well as turning movement. The upper end of the stem 20 is screw-threaded as at 22 to accommodate a nut 23. A spiral spring 24 surrounds a portion of the stem 20 and one end of the spring 24 is in contact with the nut 23 and the opposite end of said spring is in contact with the central bearing portion or spider 21, as shown most clearly in Fig. 3. The portion 15 of the element 13 is provided with a cam face 25 which may be inclined to any suitable degree transecting a horizontal plane and will be in the form of an arc of a circle. A lever 26 is employed by having one end thereof attached as at 27 to the valve member 19 with its opposite end extending beyond the portion 15 with a hole 28 in the free extremity thereof. It is to be noted that a portion of the lever 26 is in contact with the cam face 25 and this is true because of the action of the spring 24 which is of the extensible type. The spring 24 not only maintains a portion of the lever 26 in contact with the cam face 25 but also yieldingly maintains the valve member 19 in contact with the seat 18 to normally close the passage 17. It is further to be noted that the spring 24 will also permit of turning movement of the stem 20 and its valve member 19. It follows, therefore, that by imparting a turning movement to the lever 26 by the use of a hook, rod, or the like, which hook may be engaged in the hole 28, a portion of the lever will be cammed downwardly and as a result the valve member will be moved downwardly off or out of contact with the seat 18 to permit any portion of the liquid, such as oil, in the lower section of the crank case to drain out through the passage 17. By moving the lever 26 in an opposite direction from that just mentioned the valve member 19 may be returned in contact with the seat 18 to close the passage 17 as will be understood.

From the foregoing it will be apparent that the drain valve of the present inventions is of comparatively simple construction; that by making use of an element such as the element 13 described, the valve in its entirety may be so employed as to be invulnerable against flying objects or from being damaged by encountering obstructions, for example, when the crank case to which the drain valve is applied forms a part of an automobile engine, since there will not be any parts which jut downwardly; and that the portion 15, aside from serving for applying the element 13 in a drain opening, serves for protecting parts of the valve means.

Having thus described my invention, I claim:—

1. The combination with the crank case of an engine having an opening therein, of a barrel shaped screw-threaded body portion secured into said opening by means of said screw-threads and having a longitudinal passage extending therethrough, a normally closed manually operable valve means disposed within said passage, a radially extending lever for said valve means, and a cam formed on said body portion to co-act with said lever to open said valve means.

2. In a drain valve, the combination of a cylindrical body portion in the form of a plug and provided with a longitudinal passage therethrough, means to secure said body portion into an opening, a valve seat formed on said body portion, a valve member to coact with said seat, a concavity providing a cam on said body portion, a spring means to normally maintain said valve member on the seat so as to close said passage, and manually operable lever means normally resting in said concavity and adapted to actuate said valve member into an open position by coaction with said cam.

3. In a drain valve, the combination of a barrel shaped body portion having an axial passage extending therethrough and adapted to be secured into an opening, a laterally extending portion adapted to prevent said body from passing through the opening, a valve seat formed on said body portion, a valve member coacting with said seat and adapted to normally be maintained thereagainst, a cam having an arcuate face formed on said laterally extending portion, and a laterally extending lever means on said valve member adapted to be manually actuated against said face so as to move said valve from its seat.

4. A drain valve comprising an element in the nature of a screw plug, said element having a passage extending therethrough, a seat embodied by said element at the lower end of said passage, a valve member supported for movement into and out of engagement with said seat to control said passage, a cam face embodied by said element, a lever connected to the valve member, a portion of said lever adapted to traverse said cam face, and means for movably maintaining said portion of said lever in contact with said cam face, said portion of said lever traversing said cam face in the movement of said lever to move the valve member into and out of engagement with said seat to control said passage.

Signed at Long Branch, in the county of Monmouth and State of New Jersey, this 6th day of June, A. D. 1927.

MARTIN A. McCUE.